Feb. 23, 1971 J. FELLRATH ET AL 3,564,838

ELECTRONIC CLOCK

Filed Dec. 11, 1967 4 Sheets-Sheet 1

United States Patent Office 3,564,838
Patented Feb. 23, 1971

3,564,838

ELECTRONIC CLOCK

Jean Fellrath and Max Forrer, Neuchatel, Switzerland, assignors to Centre Electronique Horloger S.A., Neuchatel, Switzerland, a Swiss company Filed Dec. 11, 1967, Ser. No. 689,680
Claims priority, application Switzerland, Dec. 13, 1966, 17,739/66
Int. Cl. G04c *3/00*
U.S. Cl. 58—23 5 Claims

ABSTRACT OF THE DISCLOSURE

An electronic clock controlled by periodic wireless time signals, the signals comprising modulations of a carrier wave, the modulations occurring once every second, an additional modulation occurring in the first second of every minute in order to mark the beginning of the minute, the electronic clock further comprising a HF receiver, a detector to transform the modulations into a second pulse every second and into a second pulse followed by a minute pulse at the beginning of every minute, a step-by-step motor driving means, the motor driving means including means for visually indicating the time, the detector including means for controlling the motor means, circuit means for adjusting the indicating means in the event of lack of synchronization between the signals and the time indications, the circuit means including means for selecting the minute pulses from the second pulses, the selecting means including two inputs and an output, means for reproducing a minute pulse at the output when the selecting means is simultaneously excited by a minute pulse at one input and by a pulse complementary to one of the second pulses at the other input, the adjusting circuit including means for transducing the selected minute pulses into signals comparable with the position of the time indicating means so as to detect a lack of synchronization.

The present invention concerns an electronic clock, destined to receive periodic time signals and comprising circuits furnishing an indicating motor with periodic driving impulses, characterized in that it comprses a control signal receiver, a logical circuit with R–C components suppressing aperiodic jamming signals, a running control circuit and a phase discriminator automatically comparing a time base signal with a control signal.

Prior art attempts to provide a highly accurate electronic clock have been largely unsuccessful. Thus, aperiodic jamming signals have been known to detrimentally affect the operation of an electronic clock. Furthermore, many prior art electronic clocks have been expensive to construct and difficult to maintain.

Accordingly, it is an object of the present invention to provide an electronic clock whose operation will not be detrimentally affected by aperiodic jamming signals.

It is a further object of the present invention to provide an electronic clock that will not be expensive to construct nor difficult to maintain.

The drawing illustrates, by way of examples, two embodiments and two variants:

Figure 2:
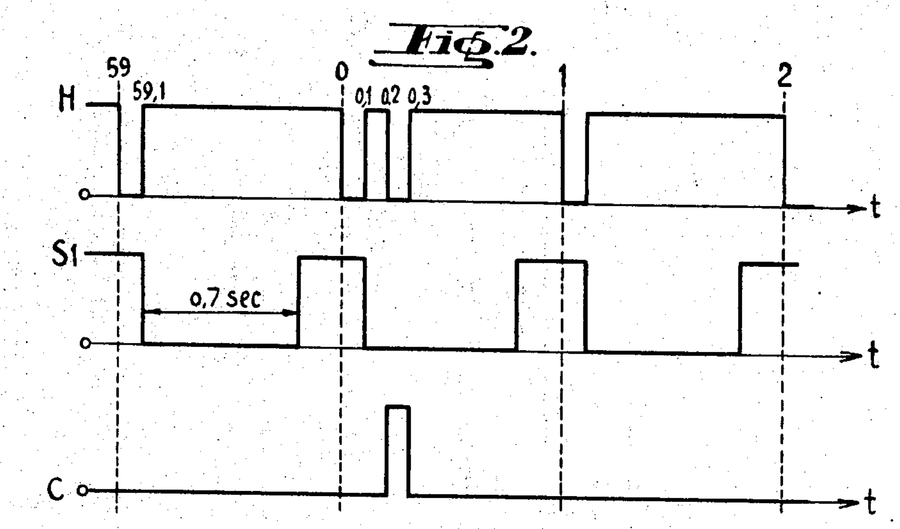
FIG. 2 is an explanatory diagram of the operation of this embodiment.

The permanent time signal is constituted by a carrier wave of 75 kHz. which is interrupted for 0.1 sec. at the beginning of each second and is interrupted twice for 0.1 sec. at the beginning of each minute. The upper curve H in FIG. 2 represents the enveloping curve of the thus modulated carrier.

Figure 1:
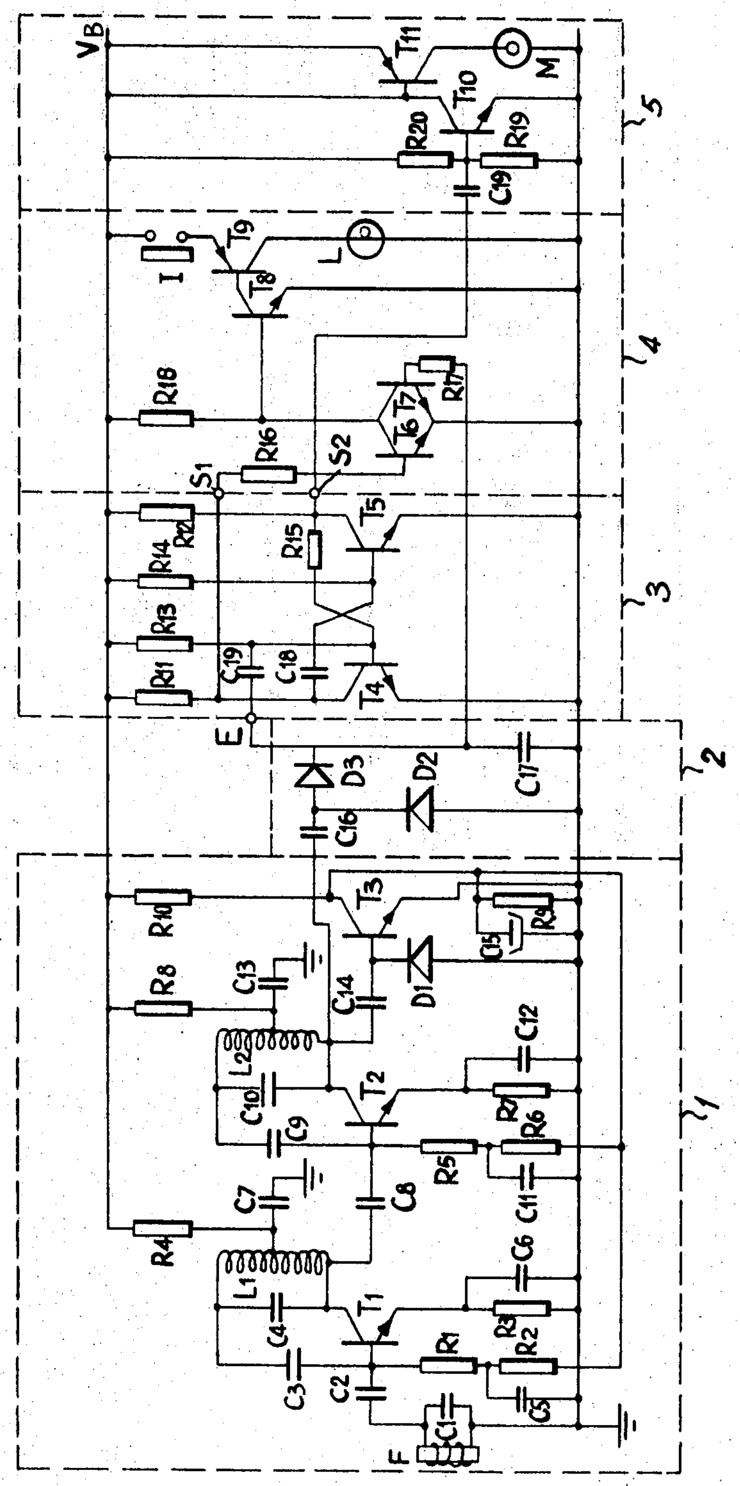
FIG. 1 shows a diagram of a first embodiment.

The clock illustrated in FIG. 1 comprises a HF receiver 1, a detector 2, a univibrator 3, a logical running control circuit 4, and a motor and its driving circuit 5.

The HF receiver comprises a ferrite antenna F in resonance with a condenser C1 and connected on one side to earth and on the other to the base of a transistor T1, through a coupling condenser C2. In addition, this base is connected by means of two resistances R1, R2 and an uncoupling condenser C5, to an automatic gain control circuit. An oscillating circuit C4, L1 is connected in the collector circuit of the transistor T1 and a neutralizing condenser C3 connects the oscillating circuit to the base. The emitter of the transistor is connected to earth through a resistance R3 and a condenser C6.

The collector of the transistor T1 is fed by the positive pole $+V_B$ of a battery (not shown), and this through a resistance R4, connected to a middle point of the self-inductance L1, connected to earth through a condenser C7. The collector of the transistor T1 is connected to the base of a transistor T2, comprised by a second HF stage, through a condenser C8. This stage is constituted like the preceding one and comprises the condensers C9–C13, a self-inductance L2 and resistances R5–R8.

Through C14, the collector of T2 acts on an automatic gain control device, formed by the transistor T3, the diode D1, the condenser C15 and the resistances R9, R10. The time constant of this device must obviously be graeter than the interruption of the carrier, i.e., than 0.1 sec. Through C16, the collector T2 also acts on the detector 2 formed by the condenser C17 and the two diodes D2, D3. The time constant of this detector must obviously be less than 0.1 sec. in order that the interruptions of the carrier may be registered. The output of the detector 2 feeds the input E of the univibrator 3 provided with two outputs S1 and S2 of opposite signs.

This univibrator, the period of which is 0.7 sec., comprises two transistors T4 and T5 connected with emitters in common, fed through the resistances R11 and R12 and polarized by resistances R13 and R14. The collector of T4 is connected to the base of T5 through a condenser C18 and the collector of T5 is connected to the base of T4 through a resistance R15. The input signal is applied to the base of T4 through a condenser C19.

In the position of rest, T4 is blocked and T5 saturated, the output S1 being in the upper position and the output S2 in the lower position. A positive pulse applied in E causes the univibrator to tip over, S1 being then in the lower position and S2 in the upper position. It remains in this position for a period of 0.7 sec. determined by the time constant C18, R14. Following this period it returns automatically to its position of rest. During the period during which it is tipped over, the univibrator remains insensitive to all input pulses.

The running control circuit 4 comprises a logical circuit NOR constituted by two transistors T6 and T7 connected as common emitter. The two collectors connected together are fed through a common resistance R18, the base of T6 being connected to the output S1 of the univibrator through a resistance R16 and the base of T7 being connected to the output of the detector through a resistance R17. The output of the logical circuit NOR, constituted by the connecting points of the collectors, acts on the base of a transistor T8 having a amplifying circuit connection with a transistor T9, the emitter circuit of the latter comprising a cut-off switch I, and the collector circuit being provided with a signal lamp L.

The operation of the control circuit is illustrated in FIG. 2. The voltage of the collectors of the transistors is in the upper position only when the bases of the two transistors are simultaneously at zero voltage, which is possible only between the second and third tenths of the first second of each minute, as illustrated in the third curve C of FIG. 2. This is owing to the fact that at the end of each interruption of the carrier H, the univibrator is tipped out of its position of rest, where it remains during 0.7 sec., the output signal S1 of the univibrator having the shape illustrated by the second curve of FIG. 2. The univibrator thus returns to its position of rest 0.2 sec. before the beginning of each second, the transistor T6 being thus blocked only between 0.1 and 0.8 sec. The base of the transistor T7 being fed by the output signal of the detector 2, it is blocked only during the first tenth of each second and during the first and the third tenths of a second of each minute, as illustrated by the curve H. The two transistors are thus blocked simultaneously only during the third tenth of a second of each minute, and if the switch I is closed, the lamp L will light up at each minute pulse.

The motor and its control circuit 5 comprise two transistors T10 and T11 with an amplifying circuit connection. The motor M, which may be of the step-by-step, pawl type, is connected in the collector circuit of T11. As for the base of the transistor T10, it is fed by the output pulses S2 of the univibrator 3, these pulses being differentiated by a condenser C19 and the input resistance of the amplifier stage T10. In addition, the base of T10 is polarized by the resistances R19 and R20.

It is obvious that in a variant, the receiver may comprise a number of HF stages which is different from two.

Figures 3, 4:
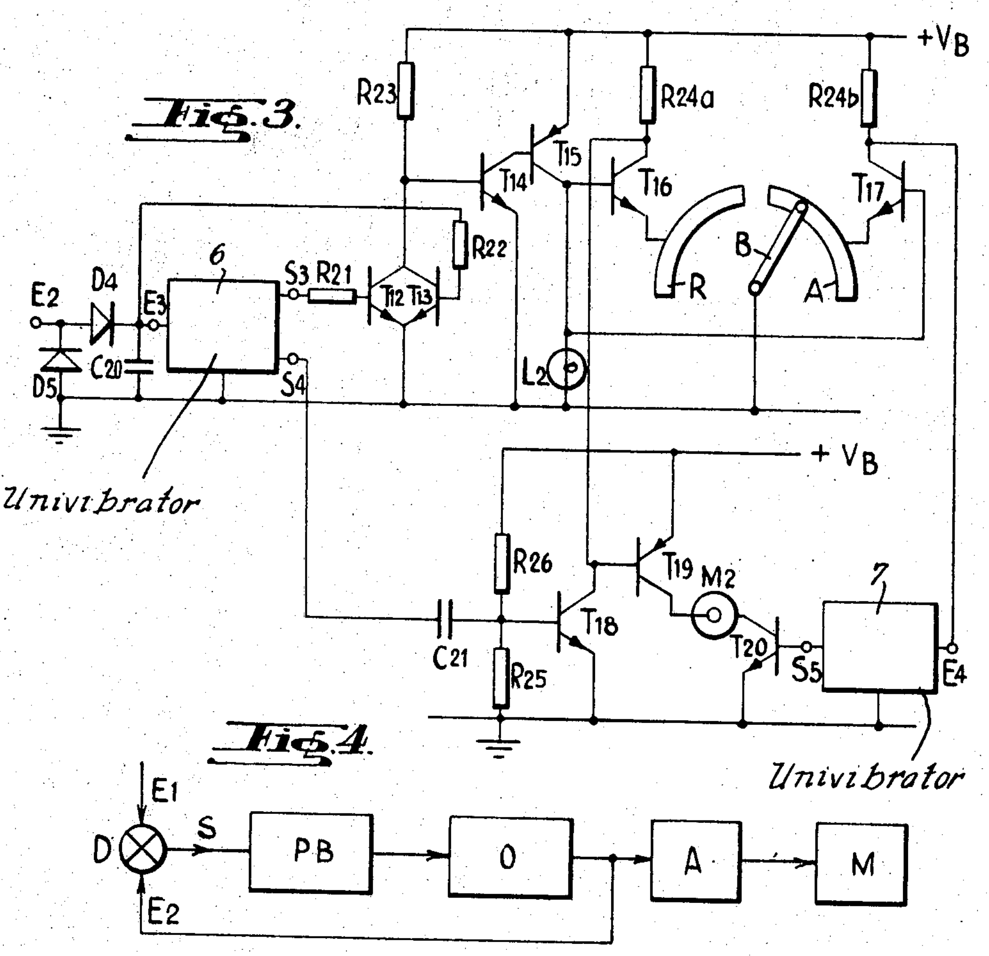
FIG. 3 shows the partial diagram of a variant of this first embodiment.
FIG. 4 shows the diagram of the principle of the second embodiment.

FIG. 3 is the diagram of the embodiment according to FIG. 1, in which the receiver is not shown, it being the same as in the preceding case.

The HF signal is applied to the input E2 of a detector comprising two diodes D4 and D5 and a condenser 20, this detector operating like the preceding one. The detected signal is applied to the input E3 of a univibrator 6 the period of which is of 0.7 sec. The univibrator 6 comprises an output S3 connected, by means of a resistance R21, to the base of a transistor T12 of a logical circuit NOR, the base of the other transistor T13 of which is connected, through a resistance R22, to the output of the detector. The common point of the two collectors T12 and T13 is connected, by means of a resistance R23, to the positive pole $+V_B$ of a battery (not shown). This common point also feeds the base of a transistor T14 of a Darlington circuit comprising a second transistor T15, in the collector circuit of which a signal lamp L2 is connected. The collector of T15 is connected to the base of a transistor T16 the emitter of which is connected to a delaying contact R and to the base of a transistor T17 the emitter of which is connected to a leading contact A. These two transistors are fed through resistances R24*a* and R24*b*. The two contacts R and A cooperate with a brush B secured to the seconds hand. The output S4 of the univibrator is connected, through a condenser C21, to the base of a transistor T18, polarized through two resistances R25 and R26. The collectors of T16 and T18 are connected to the base of T19.

The collector of T17 acts on the input E4 of a univibrator 7, the period of which is 1 sec. The output S5 of the latter is connected to the base of a transistor T20 connected as a common emitter. Lastly, the collector circuits of T19 and T20 are connected in series with a step-by-step motor M2. The operation of the circuit is as follows: the control circuit is the same as in the preceding case and operates in the same manner. The contact R is earthed during a few seconds before the minute, whilst the contact A is earthed during a few seconds after the minute. At the minute neither of these contacts is earthed.

By means of this circuit, a correction of the seconds hand is effected by using the minute pulse formed at the terminals of the signal lamp L2.

If the seconds hand is lagging behind, the brush is on the contact R when the minute pulse occurs. The emitter of T16 being earthed, it amplifies the minute pulse which is applied to T19 and consequently to the motor M2. The indication thus effects a supplementary advance of one second due to the minute pulse.

If the seconds hand is in advance, the brush B is on the contact A at the moment when the minute pulse occurs and the transistor T17 amplifies the minute pulse which it applies to the input E4 of the univibrator 7, which it causes to tip over. During one second, the output S5 of the univibrator 7 will block T20. The normal indicating step being effected 0.8 sec. after the minute pulse, by the output S4 of the univibrator 6, is thus suppressed thus retarding the indication by one second.

If the seconds hands is on time at the moment when the minute pulse arrives, neither of the transistors T16 and T17 is active and no correction is effected.

This circuit is thus capable of correcting once every minute an error of $\pm 1$ second. If in the course of one minute an error of several seconds occurs, the complete correction will necessitate several minutes.

As a variant, the components R, B and A could be replaced by a device comprising a slotted disc, a light source and two photo-cells, in order that the indicating motor may not be subjected to the friction forces between the brush and the contacts R and A, and to avoid the disadvantages resulting from a possible soiling of the contacts.

FIG. 4 shows a diagram illustrating the principle of the second embodiment, the control circuit not being shown.

The detected second pulses are applied to the input E1 of a phase discriminator D, comprising a second input E2 to which are applied the output pulses of an oscillator O. The output signal S of the discriminator D is applied to a low-pass PB suppressing the alternating component and giving a time constant to the regulation (flywheel effect) giving the circuit little sensitivity to rapid perturbations. The output signal of the low-pass is applied to the oscillator O in order to regulate its frequency. This oscillator may be constituted by a multivibrator or a blocked oscillator. The signal generated by the oscillator O is also applied to an amplifier A and from there to a motor M.

Figure 5:
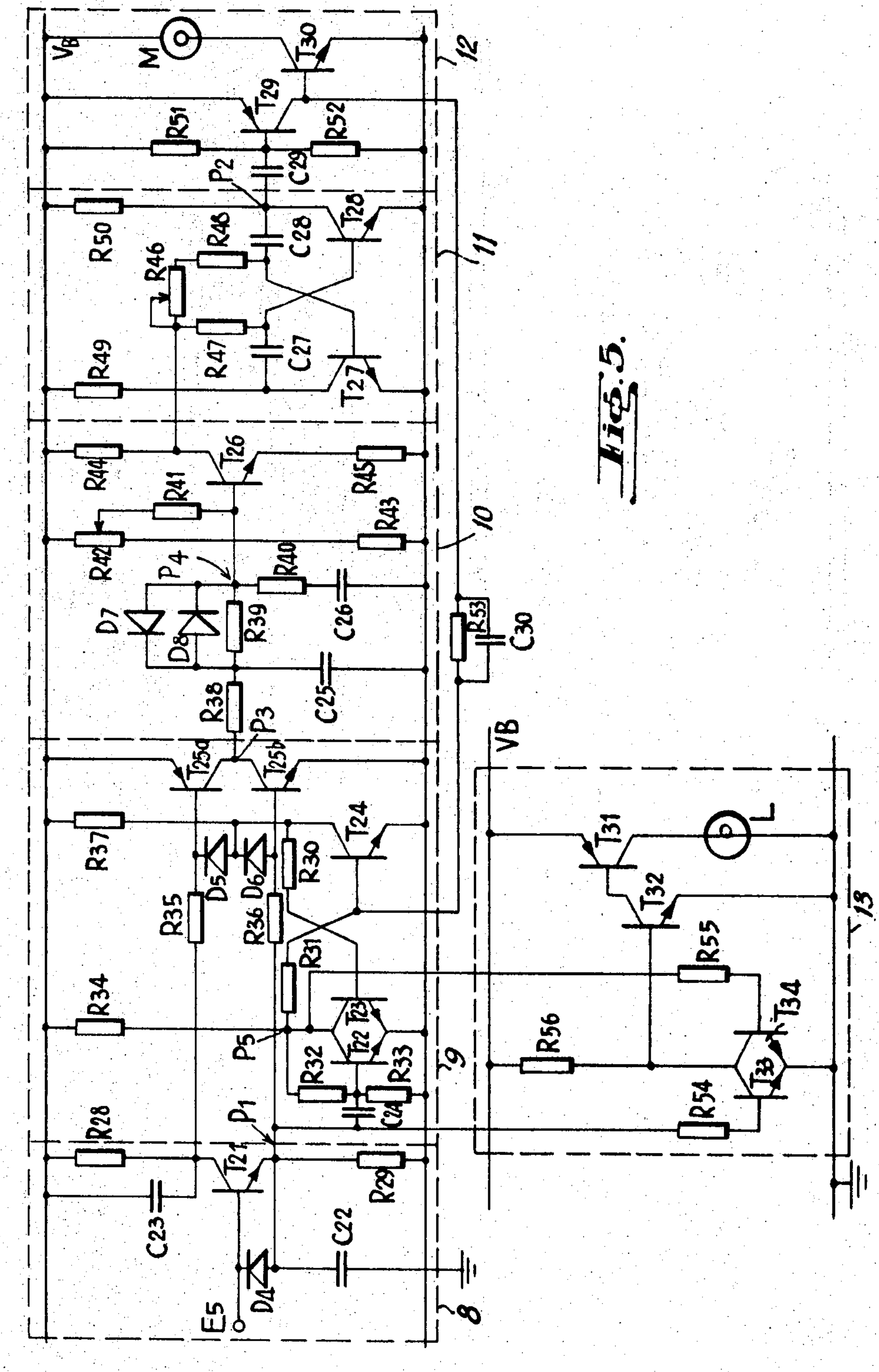
FIG. 5 shows the partial diagram of the second embodiment.

FIG. 5 shows a detailed diagram of the second embodiment in which the HF part has been omitted, as this latter can be the same as the one in the first embodiment. This embodiment comprises a detector 8, a phase discriminator 9, a filter and amplifier 10, a multivibrator 11, a motor and its control circuit 12 and a running control circuit 13.

The HF signal of 75 kHz. is applied to the input of the detector circuit 8, which comprises a diode D4 and a transistor T21 fed from the positive pole $V_B$ through a resistance R28 and a condenser C23, the emitter of T21 being connected to earth, through a resistance R29 and a condenser C22. When the carrier is applied to the input E5 it causes T21 to be saturated. The phase discriminator and amplifier 9 comprises a flip-flop constituted by the two transistors T22 and T23 and the transistor T24, the collector of T24 being connected to the base of T23, through a resistance R30 and the collectors of T22 and T23 being connected to the base of T24 through a resistance R31. The base of T22 is polarized by the two resistances R32 and R33, the two transistors T22 and T23 being fed through a resistance R34. The detected signal appearing at the point P1 is applied to the base of T22 through a condenser C24. The collecter of T24 is connected to the positive pole $V_B$ by means of a resistance R37. This discriminating circuit also comprises two transistors T25*a* and T25*b* which are complementary and connected in series, their bases being connected through resistances R35, R36 to the collector and emitter, respectively of T21 and through the diodes D5 and D6 to the collector of T24. The operation of the discriminator 9 will be described in detail later on.

The output of the discriminator 9 is applied to the input of the low-pass 10, which comprises the resistances R38, R39 and R40 and the condensers C25 and C26. The integrating circuits formed by the components R38, C25 on the one hand and R39, R40, C26 on the other have the effect of taking the mean value of the input voltage applied in P3. Two diodes D7, D8 connected in opposition and the operation of which will be explained later on, are connected in parallel with the resistance R39. The point common to the resistances R39 and R40 is connected to the base of a transistor T26, as well as to a resistance R41 the other terminal of which is connected to two resistances R42 and R43, connected in series between the positive terminal $V_B$ of the battery and earth. The collector-emitter circuit of the transistor T26 is connected between the said positive terminal and earth by means of two resistances R44, R45. The continuous current output signal of the low-pass 10, derived from the collector of T26 is applied, by means of resistances R46, R47, R48 to the bases of the two transistors T27, T28 of the multivibrator 11.

The collectors and the bases are interconnected by condensers C27, C28, the collectors being fed through resistances R49, R50. The oscillating signal of the multivibrator which is picked up in P2 is applied to the assembly 12 formed by the motor M and its control circuit, which comprises a condenser C29 applying the signal in P2 to two transistors T29, T30 which have an amplifying circuit connection. The base of T29 is polarized by the resistances R51, R52.

The feed-back loop of the frequency of the multivibrator 11 to the frequency of the input is constituted by the resistance R53 and the condenser C30 connected in parallel and connected between the base of T30 and that of T24.

The running control circuit 13 is constituted like the circuit 4 of the preceding embodiment and comprises a lamp L fed by two transistors T31, T32 connected in an amplifying circuit and controlled by a logical circuit NOR comprising the two transistors T33, T34 controlled through the two resistances R54, R55 and fed through the common resistance R56.

Figure 6:
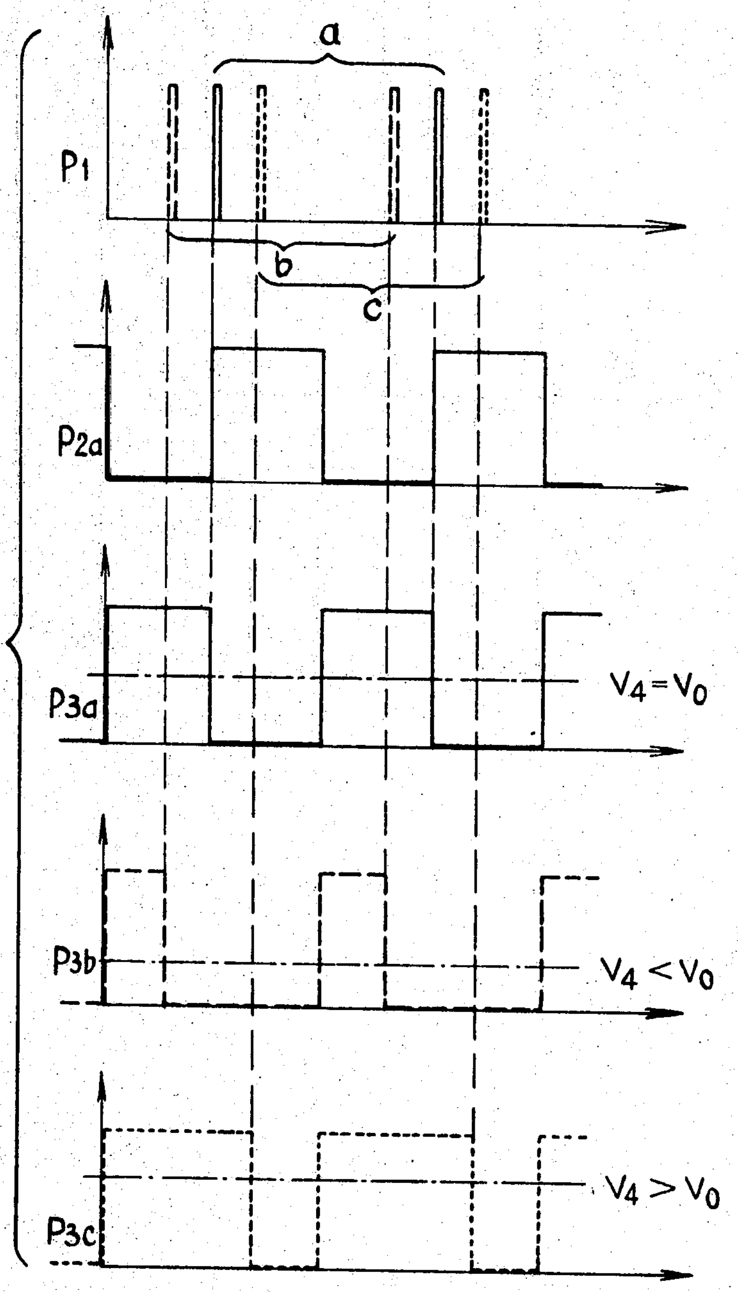
FIG. 6 is an explanatory diagram of the operation of this second embodiment.

The operation of this embodiment will be described with reference to FIG. 6, in which the curves P1, P2*a*, P3*a* to P3*c* illustrate the voltages at the points P1, P2, P3, the index *a* corresponding to an exact frequency of the multivibrator 11, the index *b* to a frequency which is too slow and the index *c* to a frequency which is too rapid. The line P2*a* only shows the voltage at the point P2 in the case of a correct frequency of the multivibrator 11, whilst the lines P3*a* to P3*c* show the voltage at the point P3 in the case of a correct, too slow, respectively too high frequency of the multivibrator.

At the point P1 we have the detected carrier which saturates T21 allowing the control of T24 and T25, and the input pulses determining the logical state 0 (low voltage) at the point P3.

At the point P2 we have the output voltage of the multivibrator 11, the negative flank of which determines the logical state 1 (high voltage) at the point P3.

At the point P3 we have the inverted output voltage of the flip-flop, but at low impedance.

At the point P4 we have taken, thanks to the integrating circuits R38, C25; R39, R40, C26, the mean value of the voltage at the point P3. This mean value $V_4$ is illustrated by the broken lines in the graphs P3*a*–P3*b* of FIG. 6.

When the frequency of the multivibrator is:

(a) exact $V_4=V_0$
(b) too slow $V_4<V_0$
(c) too high $V_4>V_0$ the transistor T26 amplifying whilst inverting the sense of the variations:

if $V_4<V_0$ the multivibrator tends to accelerate
if $V_4>V_0$ the multivibrator tends to slow down In the case of an interruption of the input signal the circuit according to FIG. 5 returns very slowly to a state of equilibrium. As a matter of fact, T21 blocks, blocking T25*a* and T25*b* in its turn. The time constant is determined by C26 and by the parallel connection of R41 and the input resistance of T26. In practice, the device neither loses nor gains a second if the signal is interrupted for three minutes.

The circuits gets rapidly into phase after being switched on or after a prolonged interruption of the input signal. As a matter of fact, C26 is charged or discharged by a nonlinear component constituted by the diodes D7 and D8 shunted by the resistances R39. When the voltage at the terminals of R39 is very different from the set value, the diodes are conducting and C26 is charged or discharged through R38 and the diodes D7 and D8.

For small differences of the voltage at the terminals of C26 in relation to the set value, the diodes D7 and D8 are practically nonconducting and C26 is charged or discharged through R39.

After a divergence in phase, the circuit returns to equilibrium following a critical damping curve for which R40 is of paramount importance.

As a variant, other phase detecting circuits may be provided, such as, for instance, a diode gate such as that of the line sweeping circuits of television receivers (Kerkof and Werner, Télévision p. 180).

The embodiment described with reference to FIG. 5 eliminates a large part of the effects of parasites and of the effect of short interruptions, but does not eliminate counting errors in the indication or errors resulting from long interruptions. An interruption may cause a difference of a few seconds which a resetting device will correct as soon as the input signal reappears.

The diagram of such a resetting device may be the same as that illustrated in FIG. 3, on condition that the outputs S3 and S4 of the univibrator 6 are replaced by the points P5 and P2, respectively.

We claim:

1. An electronic clock controlled by periodic wireless time signals, said signals comprising modulations of a carrier wave, said modulations occurring once every second, an additional modulation occurring in the first second of every minute in order to mark the beginning of the minute, said clock comprising a HF receiver, a detector to transform said modulations into a second pulse every second and into a second pulse followed by a minute pulse at the beginning of every minute, a step-by-step motor driving means, said motor means including means for visually indicating the time, said detector including means for controlling said motor means, circuit means for adjusting said indicating means in the event of lack of synchronization between said signals and said time indications, said circuit means including means for selecting said minute pulses from said second pulses, said selecting means including two inputs and an output, means for reproducing a minute pulse at said output when said selecting means is simultaneously excited by a minute pulse at one input and by a pulse complementary to one of the second pulses at the other input, said adjusting circuit including means for transducing the selected minute pulses into signals comparable with the position of said time indicating means so as to detect a lack of synchronization.

2. An electronic clock as claimed in claim 1 comprising a univibrator circuit for separating said second pulses from said minute pulses and from aperiodic noise pulses, the time constant of said univibrator being smalled than a second minus the duration of a second pulse, said univibrator circuit having an input circuit connected to said output of the detector, a first univibrator output being connected to said driving motor, a second univibrator output connected to one of the inputs of said selecting circuit, means for reproducing at said first univibrator output the selected second pulses controlling the motor, and means for producing at said second univibrator output the pulses complementary to the second pulses of said detector.

3. An electronic clock as claimed in claim 1, comprising an amplifying circuit, said amplifying circuit including an input connected to the output of said selecting circuit, and means connecting an output of said amplifier to a signal lamp.

4. An electronic clock synchronized by periodic wireless time signals and adjusted by periodic wireless reference signals, comprising an HF receiver, detector means for demodulating received time signals and reference signals and transforming them into time pulses and reference pulses, means for presenting said pulses at an output of said detector means, a step-by-step motor driving means for visually indicating the time, oscillator means for producing periodic impulses to control said motor means, amplifying circuit means interconnected between an output of said oscillator means and an input of said motor means, a phase discriminator circuit for comparing the pulses produced by said detector with the impulses controlling said motor means, said phase discriminator circuit producing a reference signal at a first output as a function of phase shifting, said clock further comprising a low-pass-filter circuit interconnected between the first output of said phase discriminator circuit and an input of said oscillator means in order to equalize quick variations of the reference signal, the frequency of the controlling impulses produced by said oscillator being synchronized by means of the reference signal, said phase discriminator circuit having a first and a second input connected to the output of said detector means and connected to the output of the amplifier circuit respectively, a second and a third output of said phase discriminator circuit connected to a first and a second input respectively of said adjusting circuit, said adjusting circuit further including a circuit for selecting the reference pulses from the time pulses and a circuit for transducing the selected reference pulses into signals comparable with the position of the indicating means in order to detect a lack of synchronization.

5. An electronic clock as claimed in claim 4, further including a resetting device comprising a position indicator means mechanically coupled to said time indicating means, a resetting circuit for suppressing impulses, means for driving said motor when visual indication of time is too advanced at the moment of appearance of the reference pulses, means for producing supplementary impulses in order to drive the motor when visual indication of time is late in the moment of appearance of the reference pulses, said position indicator means comprising a first contact, a second contact, a brush co-operating with said first and second contacts as a switch, the three elements of the switch being so arranged at said indicating means that said brush contacts said first contact when said indicating means passes a reference position, said brush contacting said second contact when said indicating means are positioned before the reference position, a resetting circuit comprising an interrupting circuit, an output of said resetting circuit connected to the input of a relay, said relay including means for switching the input of said motor means, an impulse transducing circuit having an output connected to the input of said motor means, said interrupting circuit having two inputs connected to said first contact and to an output of said selecting circuit respectively, a phase comparator, said impulse transducing circuit having two inputs connected to said second contact and to the output of said selecting circuit respectively, a phase comparator, an amplifier for transducing the reference pulses to additional impulses to drive the motor when said phase comparator connects the one input with the output of the transducing circuit.

References Cited

UNITED STATES PATENTS

| | | | |
|---|---|---|---|
| 3,011,078 | 11/1961 | Reynolds, Jr. | 307—140 |
| 3,217,258 | 11/1965 | Arlin et al. | 325—363 |

RICHARD B. WILKINSON, Primary Examiner

E. C. SIMMONS, Assistant Examiner

U.S. Cl. X.R.

58—34